UNITED STATES PATENT OFFICE.

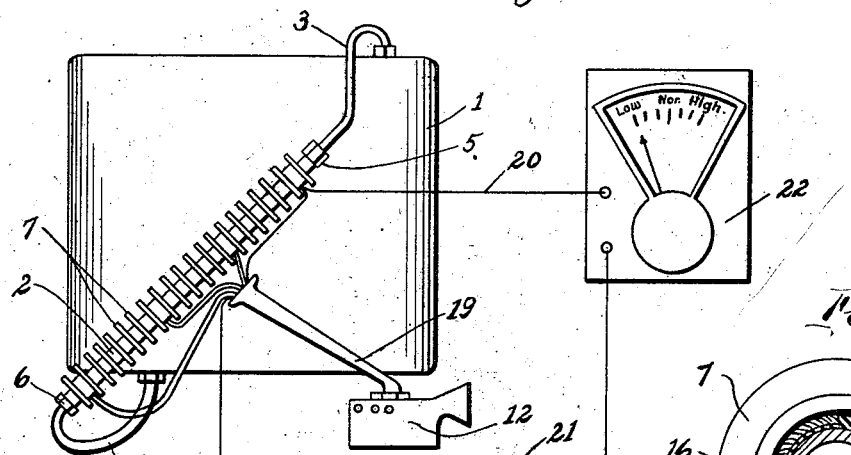
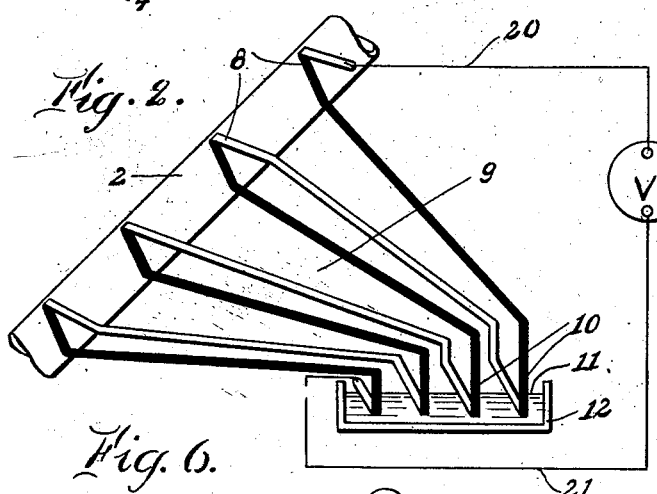
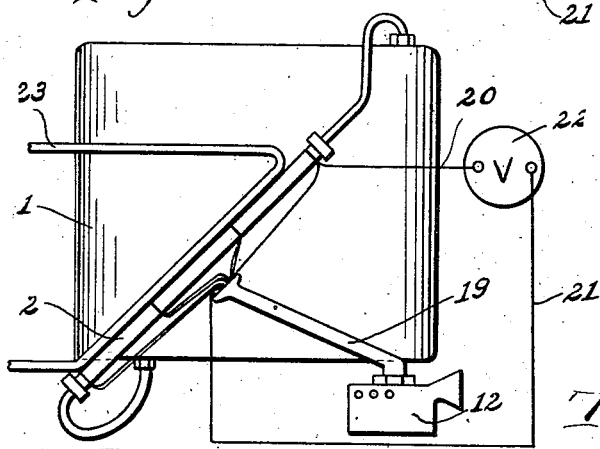
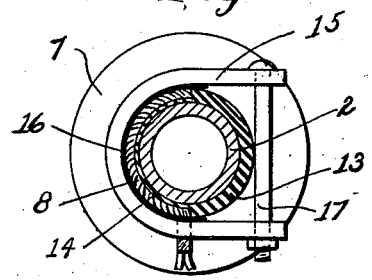
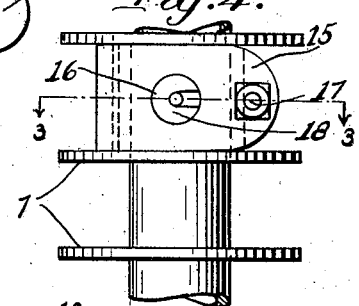
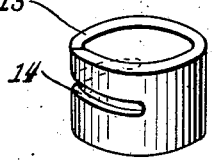

THOMAS S. DERR, OF BROOKLINE, MASSACHUSETTS.

WATER-LEVEL INDICATOR.

1,357,850.

Specification of Letters Patent.

Patented Nov. 2, 1920.

Application filed July 2, 1919. Serial No. 308,217.

*To all whom it may concern:*

Be it known that I, THOMAS S. DERR, a citizen of the United States, and resident of Brookline, in the county of Norfolk and State of Massachusetts, have invented new and useful Improvements in Water-Level Indicators, of which the following is a specification.

This invention relates to a liquid level indicator and more particularly to an electrical indicator especially adapted for use on steam propelled vehicles.

On steam propelled vehicles it is customary to employ steam boilers which carry very high steam pressure. It is therefore practically impossible to use the usual gage glass as the high pressure is liable to rupture the glass and force out the packing between the glass and the water-column connections to which it is attached. Float controlled indicators have been sometimes used, but these are open to the objection that the float mechanism becomes corroded and liable to stick. As it is extremely essential in such high pressure generators to maintain the requisite amount of water in the generator, neither too much water nor too little, the water level indicator must be thoroughly reliable and accurate. It is therefore the principal object of my invention to provide a simple reliable and accurate means for indicating the level of a body of water or liquid, particularly apparatus of the character referred to. A further object is to provide electrical means for indicating water level, and especially the water level in water columns of high pressure boilers of steam vehicles.

In apparatus of the character referred to the water and the space above the water have widely different temperatures, the temperature of the water being approximately the temperature at which water boils and the temperature of the space above the water being the temperature of saturated steam which depends upon the pressure maintained in the boiler. The present invention utilizes this temperature phenomenon by heat responsive means arranged to respond to one of said temperatures in varying degree depending upon the height of the liquid in the container and more particularly by heat responsive means arranged to respond to both of said temperatures but in varying proportions depending upon the height of the liquid in the container. The heat responsive means may comprise a single device in which case it is preferably located either at the normal level or at the minimum safe level of the water, or it may comprise a plurality of devices vertically spaced along the boiler or a water pipe communicating with the boiler so that the respective devices respond to one or the other of said temperatures in varying degree, or to both of said temperatures in varying proportions, depending upon the height of water in the container.

In order more clearly to set forth the nature of my invention I have disclosed certain concrete embodiments thereof in the following description and the accompanying drawings in which—

Figure 1 illustrates in part diagrammatically one embodiment of my invention;

Fig. 2 is a circuit diagram of the electrical connections employed in carrying out my invention;

Fig. 3 is a transverse section taken on line 3—3 of Fig. 4 certain parts being shown in elevation showing one method of securing a junction of the thermopile in contact with the exterior surface of the water column;

Fig. 4 is an enlarged side view of a portion of the water column showing a clamp for securing a junction of the thermopile in contact with the exterior surface of the water column;

Fig. 5 is a view of an insulating bushing employed in the clamp; and

Fig. 6 is a diagrammatic view showing a further embodiment of my invention.

Referring to Figs. 1 and 2, I have illustrated at 1 a high pressure steam boiler of the type usually employed on steam propelled vehicles. The boiler is provided with a water column 2, connected to the upper portion of the boiler above the normal water level, by a tube 3, and connected to the bottom of the boiler by a tube 4. The water column may be connected to the tubes 3 and 4 in any suitable manner as by unions 5 and 6, and is preferably inclined, as illustrated, at any convenient angle to the horizontal for the purpose of providing a long water column.

Surrounding the column 2 and either cast integrally therewith or attached thereto in any suitable manner are washers or fins 7 spaced along the column from a point below the bottom of the boiler to a point substantially opposite the normal water level of the boiler. These fins by radiating heat to the atmosphere serve to minimize conduction of heat which to a slight extent tends to travel downwardly along the water column from the upper hot end thereof which is filled with steam, toward the cooler regions of the column opposite the bottom of the boiler. Any region of the column below the water level is therefore rendered cooler thus increasing the difference of temperature between the regions of the column below and above the water level. The upper end of the column will have substantially the temperature of the steam which fills the column above the water line. At the water line the temperature of the column will be substantially that of the water as it flashes into steam and the temperature of the column will decrease gradually along the column from the water line to the bottom of the column. If then, the water level in the column drops, more of the column will be filled with steam and less with water and consequently more of the upper portion of the column will rise in temperature to the temperature of the steam and the lower portion of the column will become hotter as the water within it is hotter. Again if the water level rises in the column the temperature of the column will become lower throughout its length.

If then the temperatures of the column resulting from an excess of water in the column or from an insufficiency of water, are utilized to produce suitable indications, a reliable and accurate means is attained for indicating the water level in the column. I have found that such an indication may readily be obtained by associating a thermopile with the water column in such manner that changes of temperature along the column will result in changes of potential across the terminals of the thermopile, which potential changes may conveniently be indicated upon an indicating instrument such as a voltmeter or ammeter.

I have therefore positioned at intervals along the column 2, hot junctions 8 of a thermopile 9. These junctions are preferably equally spaced along the column, the uppermost junction being positioned just above the normal water level of the column, and the lowermost junction just below the bottom of the boiler. The alternate or cold junctions 10 of the thermopile may be brought together at a point removed from the boiler where they are maintained at a temperature lower than that of the coolest of the junctions associated with the column 2. They may be cooled by being exposed to currents of air produced during the forward motion of the machine, or as I have illustrated by being immersed in a bath of air-cooled oil 11 disposed in a suitable container 12 through which air is forced by the forward movement of the car.

The thermopile may conveniently be formed from alternate pieces of wire of different material as for example copper wire and constantan. While I herein mention copper and constantan as the most suitable materials, I wish it to be clearly understood that any two dissimilar metals might be used. The adjoining ends of the wires may be twisted together to form the junctions of the thermopile or may be soldered or joined in any other suitable manner.

The twisted junctions which serve as hot junctions may be insulatedly clamped to the water column or attached in any other suitable manner. In Figs. 1 to 5 I have disclosed a clamp for securing each junction to the column which comprises a split bushing 13 of insulating material having a circumferential groove 14 for receiving the twisted ends of the wires at the junction, and a metallic U-shaped clamp 15 which is adapted to surround the bushing 13 and the column 2. To clamp a junction 8 into contact with the column 2, the split bushing 13 is opened up and sprung around the column 2 between adjacent fins 7 and the junction 8 is placed in the groove 14. A strip of insulation 16 is then placed over the bushing 13 covering the junction 8 and the clamp 15 is applied as shown in Fig. 3 and tightened by bolt 17, the wires leading to the junction extending through the opening 18 in the clamp.

The wires leading from the hot junctions 8 to the cold junctions 10 may conveniently be inclosed in a tube 19 which is connected to the oil container 12. The terminals of the thermopile lead by wires 20 and 21 to the terminals of an indicating instrument 22 of the voltmeter type. The instrument may be calibrated as shown in Fig. 1 in terms of water level and mounted for convenience on the dashboard of the vehicle.

In Fig. 6 I have disclosed a further embodiment of my invention in which the water column 2 is provided with a modified means for radiating heat from the column. This means comprises a tube 23 brazed to the side of the water column and connected preferably into the water circulation system of the power plant. Cold water is thus circulated through the tube 23 and conducts away any excess heat which tends to travel down the column from the hot steam end to the cooler water end thereof.

In operation, when the water in the boiler is at the normal level or the level at which the boiler functions most efficiently, the uppermost junction 8 is heated to a temperature substantially that of the steam in the boiler and the remaining junctions 8 to temperatures corresponding to the temperature of the water at various levels in the column. Under these conditions as the junctions 10 are maintained at a relatively low temperature a certain difference of potential will exist across the terminals of the thermopile 9 which may be indicated on the meter 22 as normal. If the water level falls due for example to faulty operation, or lack of water supply, more of the junctions 8 will be exposed to a higher temperature existing because of the presence of more steam in the column and a greater potential will exist across the terminals of the thermopile which will cause the indicator needle to swing over the scale in one direction until when a dangeously low water level is reached the needle will indicate low. On the other hand if the boiler receives an excess of water, steam is driven out of the water column in proximity to the junctions 8 and the potential across the terminals of the thermopile is reduced below normal thereby causing the needle of the indicator to move toward the high water calibrations of its scale until when a water level is reached which would be dangerous the needle will indicate high.

While I have for the purpose of illustration, disclosed my invention applied to a high pressure steam boiler such as is employed on steam vehicles, it is to be understood that I have done so only by way of exemplification, and that the invention may be employed in any situation where it is desirable to transmit a liquid level indication to a distance.

It is apparent from the foregoing description that I have provided a simple, reliable indicating system especially adapted for use on steam motor vehicles, the indicator of which is of such a nature that it may be installed on the dashboard of the vehicle remote from the boiler.

I claim:

1. In a water level indicator, a boiler, a water column connected thereto, a multiple junction thermopile associated with said column for generating a current of electricity, certain junctions of said thermopile being positioned to be maintained at a relatively low temperature and other junctions of said thermopile being positioned at intervals in proximity to said water column and maintained at the temperature thereof, whereby when the water in said column falls said column increases in temperature thereby causing a greater current generation by said thermopile, and means controlled by said current for indicating the water level in said column.

2. In a water level indicator, a boiler, a water column connected thereto, a thermopile associated with said column for generating a current of electricity, certain junctions of said thermopile being positioned to be maintained at a relatively low temperature and other junctions of said thermopile being spaced at substantially equal intervals along said column in contact therewith and maintained at the temperature of said column at the points of contact, and means controlled by said current for indicating the water level in said column.

3. In a water level indicator, a boiler, an inclined water column connected thereto, heat dissipating means associated with said column, a thermopile, associated with said column for generating a current of electricity, certain junctions of which are positioned to be maintained at a relatively low temperature, and other junctions of which are spaced at substantially equal intervals along said column in contact therewith and maintained at the temperature thereof at the points of contact, and means controlled by said current for indicating the water level in said column.

4. In a water level indicator, a boiler, a water column connected thereto, heat dissipating fins on said column, a thermopile associated with said column for generating a current of electricity, certain junctions of which are positioned to be maintained at a relatively low temperature, and other junctions of which are spaced at substantially equal intervals along said column in contact therewith and maintained at the temperature thereof at the points of contact, and means controlled by said current for indicating the water level in said column.

5. In apparatus having a container partially filled with liquid, the temperature of the liquid and the space above the liquid being different, the combination with said container of a plurality of thermo-electric couples vertically spaced along said chamber so as to respond to said temperature in varying degree depending upon the height of the liquid in the container, the couples being connected in series and means controlled jointly thereby for indicating the liquid level in the container.

6. In a water level indicator, a boiler, a water column connected thereto, a thermopile associated with said column for generating a current of electricity, certain junctions of said thermopile being adapted to be maintained at a relatively low temperature and other junctions of said thermopile being spaced along said column and adapted to be maintained at the temperature of the adjacent portion of the column and means controlled by said current for indicating the water level in said column.

7. In a water level indicator, a boiler, a water column connected thereto, means for dissipating heat associated with said column, a thermopile associated with said column and adapted to generate a current of electricity, certain junctions of said thermopile being associated with means adapted to maintain them at a relatively low temperature, other junctions being spaced along said column in contact therewith and maintained at the temperature thereof at the points of contact, and means controlled by said current for indicating the water level in said column.

Signed by me at Boston, Massachusetts, this 27th day of June 1919.

THOMAS S. DERR.